United States Patent
Ageyev et al.

(10) Patent No.: US 7,853,681 B2
(45) Date of Patent: Dec. 14, 2010

(54) METHOD FOR CONTROLLING HOST THROUGHPUT TO A COMPUTER STORAGE SUBSYSTEM

(75) Inventors: Igor I. Ageyev, Tucson, AZ (US); Gary Anna, Tucson, AZ (US); Thomas W. Bish, Tucson, AZ (US); Kimberly A. Bortz, Tucson, AZ (US); Joseph M. Swingler, Tucson, AZ (US)

(73) Assignee: International Business Machines Corporation, Armonk, NY (US)

( * ) Notice: Subject to any disclaimer, the term of this patent is extended or adjusted under 35 U.S.C. 154(b) by 204 days.

(21) Appl. No.: 12/165,019

(22) Filed: Jun. 30, 2008

(65) Prior Publication Data

US 2009/0327469 A1    Dec. 31, 2009

(51) Int. Cl.
*G06F 15/173* (2006.01)
(52) U.S. Cl. ............ 709/223; 709/233; 370/329; 370/230
(58) Field of Classification Search ......... 709/223, 709/233
See application file for complete search history.

(56) References Cited

U.S. PATENT DOCUMENTS 6,910,079 B2 * 6/2005 Zimmermann et al. ...... 709/233

OTHER PUBLICATIONS

Accounting Dictionary (4th Edition), Joel G. Siegel, Barron's Educational Series; http://www.answers.com/topic/exponential-smoothing, pp. 1-2.*

Wang et al.; "A Cross-Layer Approach for Concurrent Delay and Throughput Assurances in Multihop Wireless Hotspots"; Mobile Networks and Applications 10, 341-353, 2005; 2005 Springer Science + Business Media, Inc.; Manufactured in the Netherlands.

Merkel et al.; "Balancing Power Consumption in Multiprocessor Systems"; pp. 403-414; EuroSys '06, Apr. 18-21, 2006, Leuven, Belgium.

Brunstrom et al.; "Experimental Evaluation of Dynamic Data Allocation Strategies in a Distributed Database with Changing Workloads"; pp. 395-402; CIKM '95, Baltimore MD USA.

* cited by examiner

*Primary Examiner*—John Follansbee
*Assistant Examiner*—Glenford Madamba
(74) *Attorney, Agent, or Firm*—Kunzler Needham Massey & Thorpe

(57) ABSTRACT

A method for controlling the throughput in a communications channel between a host and its storage subsystem is disclosed. A determination is made whether or not a total throughput value is greater than a predetermined maximum throughput value. If the total throughput value is greater than the predetermined maximum throughput value, a delay is applied to the communications channel. If the total throughput value is not greater than the predetermined maximum throughput value, another determination is made whether or not one time period has completed. If one time period has completed, a total throughput value and an exponential moving average (EMA) throughput value of the communications channel is retrieved, a new EMA throughput value is generated based on the total throughput value and the EMA throughput value, and adjusting the total throughput value based on whether or not the new throughput value is greater than a predetermined maximum throughput value.

3 Claims, 2 Drawing Sheets

METHOD FOR CONTROLLING HOST THROUGHPUT TO A COMPUTER STORAGE SUBSYSTEM

BACKGROUND OF THE INVENTION

1. Technical Field

The present invention relates to computer system controls in general, and more particularly, to a method for controlling host throughput to a computer storage subsystem.

2. Description of Related Art

A computer system typically include a host connected to a storage subsystem. The storage subsystem may include a variety of storage devices such as hard drives and tape drives. The storage subsystem may also include a virtual tape storage system in which hard drives are utilized to emulate tape drives and tape cartridges. The host may write data to and read data from the storage subsystem over a communications channel. The throughput of the communications channel is commonly measured as the amount of data being passed through the communications channel per unit time, such as bytes per second.

While it is generally desirable to maintain the throughput of the communications channel between the host and the storage subsystem at a maximum, sometimes it may be beneficial to limit or "throttle" the throughput of the communications channel between the host and the storage subsystem, either for technical reasons or commercial reasons.

SUMMARY OF THE INVENTION

The present invention provides a method for controlling the throughput in a communications channel between a host and its storage subsystem. In accordance with a preferred embodiment of the present invention, a determination is made whether or not a total throughput value is greater than a predetermined maximum throughput value. If the total throughput value is greater than the predetermined maximum throughput value, a delay is applied to the communications channel. If the total throughput value is not greater than the predetermined maximum throughput value, another determination is made whether or not one time period has completed. If one time period has completed, a total throughput value and an exponential moving average (EMA) throughput value of the communications channel is retrieved, a new EMA throughput value is generated based on the total throughput value and the EMA throughput value, and adjusting the total throughput value based on whether or not the new throughput value is greater than a predetermined maximum throughput value.

All features and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

Figure 1:
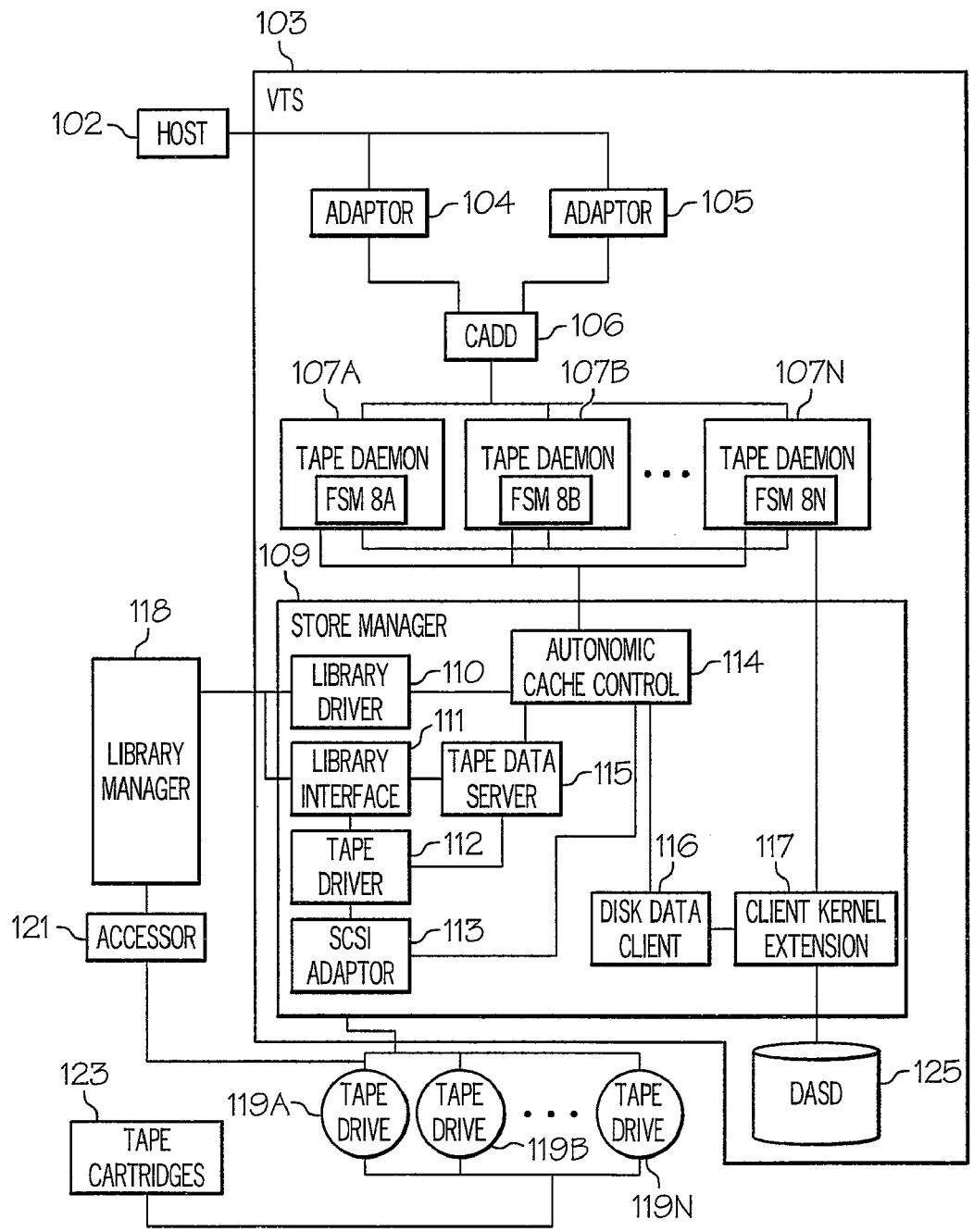
FIG. 1 is a block diagram of a computer system in which a preferred embodiment of the present invention is incorporated.

With reference now to the drawings, and in particular to FIG. 1, there is illustrated a block diagram of a computer system in which a preferred embodiment of the present invention is incorporated. As shown, a host 102 is connected to a virtual tape server (VTS) 103 via adapters 104 and 105. By utilizing tape daemons 107A-107N to emulate physical tape drives, VTS 103 allows host 102 to believe that it is communicating with physical tape drives rather than a hard disk. Each of tape daemons 107A-107N includes a respective one of file system managers (FSMs) 108A-108N for generating files in a direct access storage device (DASD) 125. A channel access device driver (CADD) 106 is utilized to receive read and write tape operations from host 102 to tape daemons 107A-107N. For a write operation, tape daemons 107A-107N receive data, create logical volumes, and write the logical volumes as files in DASD 125. For a read operation, tape daemons 107A-107N access DASD 125 to retrieve data through a client kernel extension 117 and return the data to host 102.

Storage manager 109 manages the transferring of data from DASD 125 to tape drives 119A-119N. An autonomic cache control 114 controls the transfer of data from DASD 125 to tape drives 119A-119N in response to transfer operations received from host 102. In particular, host 102 indicates to autonomic cache control 114 which logical volumes are to be placed into particular pools of tape cartridges 123. Autonomic cache control 114 maintains metadata on which files are stored in DASD 125. Disk data client 116 requests data from client kernel extension 117, which retrieves the requested data from DASD 125 and forwards the data to disk data client 116. In turn, disk data client 116 forwards the data to tape data server 115 at the request of autonomic cache control 114.

Tape data server 115 controls the writing of data to tape drives 119A-119N. The data is sent from tape data server 115 to a tape driver 112, to a SCSI adaptor 113 and to tape drives 119A-119N. Tape data server 115 uses a library interface 111 to inform a library manager 118 that tape cartridge 123 is to be put into one of tape drives 119A-119N. Autonomic cache control 114 sends messages to library manager 118 through library driver 110. Library manager 118 manages the mounting and unmounting of tape cartridges 123 from tape drives 119A-119N. When library manager 118 receives a notification to mount or unmount one of tape cartridges 123, library manager 118 notifies an accessor 121, which is used to access tape drives 119A-119N. Accessor 121 mounts and unmounts tape drives 119A-119N.

During operation, the amount of throughput in a communications channel between host 102 and VTS 103 is monitored, and the amount of throughput is accumulated and stored in a shared memory location as a total throughput value. As mentioned previously, sometimes it is beneficial to limit or "throttle" the throughput of the communications channel between host 102 and VTS 103. The degree of throttling, which may be dictated by the type of applications, can be adjusted by the computer system manufacturer via appropriate software at factory or in the field. With the throughput control, if the total throughput value exceeds a predetermined maximum throughput value, the throughput of the communications channel between host 102 and VTS 103 will be delayed accordingly.

In order to control the throughput in the communications channel between host 102 and VTS 103, the total throughput value is obtained periodically from the shared memory location during system operation. In accordance with a preferred embodiment of the present invention, a timer, which may be established in CADD 106, is utilized to define the exact time at which the total throughput value is obtained from the shared memory location during system operation. The timer can indicate the boundaries of succeeding time periods. The timer may, for example, "pop" at the conclusion of each constant time period, and the total throughput value is then retrieved from the shared memory location at such instant. Each time period can be, for example, one second long.

Figure 2:
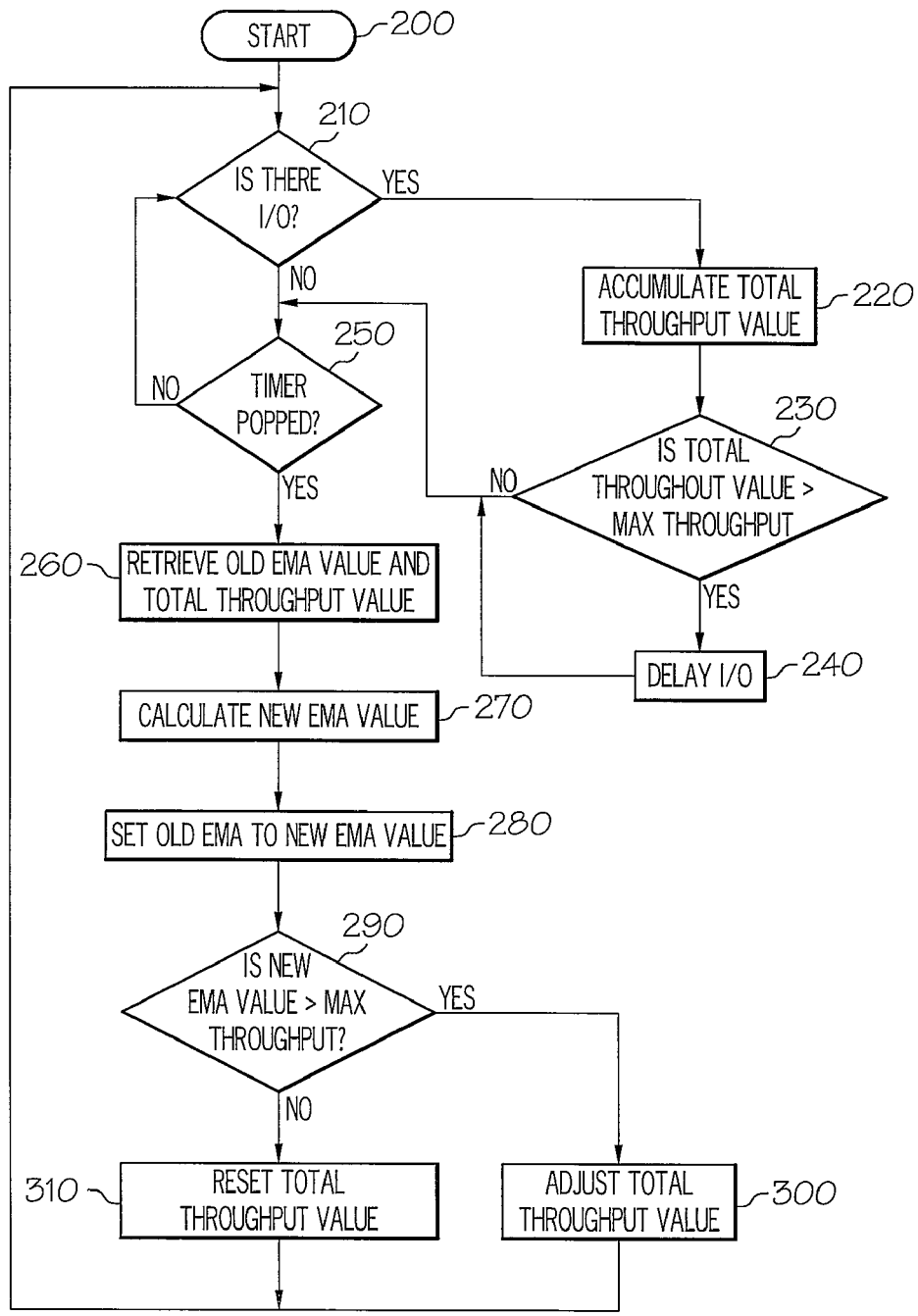
FIG. 2 is a high-level logic flow diagram of a method for controlling the throughput in a communications channel within the computer system from FIG. 1, in accordance with a preferred embodiment of the present invention of the present invention.

With reference now to FIG. 2, there is depicted a high-level logic flow diagram of a method for controlling the throughput in the communications channel between host 102 and VTS 103, in accordance with a preferred embodiment of the present invention of the present invention. Starting at block 200, a determination is made whether or not there is any input/output (I/O) activity in the communications channel between host 102 and VTS 103, as shown in block 210. If there is are I/O activities, then the throughput values are accumulated as a total throughput value to be stored in a shared memory location, as depicted in block 220. The total throughput value is preferably expressed in bytes per second. Next, a determination is made whether or not the total throughput value is greater than a maximum throughput value, as shown in block 230. The maximum throughput value is preferably set by a system manufacturer, and it cannot be changed by a user of the computer system without the approval from the system manufacturer.

If the total throughput value is greater than the maximum throughput value, throttling is utilized to introduce a delay in the communications channel between host 102 and VTS 103, as depicted in block 240. This delay equals to the remainder of the time period. After the delay has been executed by adapters 104 and 105 (from FIG. 1), the process proceeds to block 250. However, if the total throughput value is less than or equal to the maximum throughput value, the process proceeds to block 250.

Otherwise, if there is no I/O activity, the process proceeds to block 250 where a determination is made whether or not the above-mentioned timer has popped. If the timer has not popped, the process returns to block 210 to determine if an I/O event has occurred. Once the timer has popped, indicating the conclusion of one time period and the beginning of a next timer period, the total throughput value and old exponential moving average (EMA) throughput value are then retrieved from the shared memory location, as depicted in block 260. Like the total throughput value, the old EMA throughput value is also expressed in bytes per second. Using the values retrieved in block 260, a new EMA throughput value is calculated, as shown in block 270, according to the following formula:

new EMA throughput value=[(total throughput value−old EMA throughput value)×multiplier]+old EMA throughput value The multiplier, which is a programmable parameter also set by the system manufacturer, is a percentage that reflects the weight being placed on the current time period. After the new EMA throughput value has been calculated, the old EMA throughput value stored in the shared memory location is then replaced by the new EMA throughput value, as depicted in block 280.

A determination is made whether or not the new EMA throughput value is greater than the maximum throughput value, as shown in block 290. If the new EMA throughput value is greater than the maximum throughput value, the total throughput value stored in the shared memory location is adjusted to the difference of the new EMA throughput value and the maximum throughput value, as depicted in block 300, as follows:

total throughput value=new EMA throughput value−maximum throughput value

The adjustment is intended to "penalize" the total throughput value at the beginning of a new time period, which will cause the total throughput value to reach the maximum throughput value sooner if input/output activities in the communications channel between host 102 and VTS 103 continue at a rate above the maximum throughput value. After the adjustment, the process then returns to block 210 to wait for a next time period (i.e., the timer pops again).

However, if the new EMA throughput value is equal to or less than the maximum EMA throughput value, then the total throughput value stored in the shared memory location is reset, preferably to zero, as shown in block 310, and the process returns to block 210 to wait for the next time period.

As has been described, the present invention provides a method for controlling throughput in a communications channel between a host and its storage subsystem. With the present invention, the EMA of the throughput value is utilized to determine if a penalty needs to be applied to a next time period's total throughput value. Once the total throughput value reaches a predetermined maximum throughput value, the host throughput is delayed. By applying EMA, the implementations of host throughput delay become less erratic.

While an illustrative embodiment of the present invention has been described in the context of a fully functional computer system, those skilled in the art will appreciate that the software aspects of an illustrative embodiment of the present invention are capable of being distributed as a program product in a variety of forms, and that an illustrative embodiment of the present invention applies equally regardless of the particular type of media used to actually carry out the distribution. Examples of the types of media include recordable type media such as solid-state thumb drives, floppy disks, hard disk drives, CD ROMs, DVDs, HD-DVDs, Blu-Ray Disk, ultra-density optical, and transmission type media such as digital and analog communication links. These communication links may involve, including without limitation a Fibre Channel loop, Small Computer System Interface (SCSI), Internet SCSI (iSCSI), Serial Attach SCSI (SAS), Fibre Channel, SCSI over Fibre Channel, Ethernet, Fibre Channel over Ethernet (FCoE), Infiniband, and Serial ATA (SATA) over optical fibre or copper.

While the invention has been particularly shown and described with reference to a preferred embodiment, it will be understood by those skilled in the art that various changes in form and detail may be made therein without departing from the spirit and scope of the invention.

What is claimed is:

1. A method for controlling throughput in a communications channel between a host and a storage subsystem within a computer system, said method comprising:

determining whether or not a total throughput value is greater than a predetermined maximum throughput value set by a manufacturer of the storage subsystem;

in a determination that said total throughput value is greater than said predetermined maximum throughput value, applying a delay to said communications channel before determining whether or not one time period has completed;

in a determination that said total throughput value is not greater than said predetermined maximum throughput value, determining whether or not one time period has completed; and in a determination that one time period has completed, retrieving a total throughput value and an exponential moving average (EMA) throughput value of said communications channel;

generating a new EMA throughput value en equal to $((t-eo)h)-eo$, where t is the total throughput value, eo is an old EMA value, and h is a percentage; and adjusting said total throughput value to said total throughput value minus said predetermined maximum throughput value if said new EMA throughput value is greater than said predetermined maximum throughput value else adjusting said total throughput value to zero if said new EMA throughput value is not greater than said predetermined maximum throughput value.

2. A non-transitory computer readable storage medium storing a computer program product executed by a storage manager for controlling throughput in a communications channel between a host and a storage subsystem within a computer system, said computer readable medium comprising:

computer program code for determining whether or not a total throughput value is greater than a predetermined maximum throughput value set by a manufacturer of the storage subsystem;

computer program code for, in a determination that said total throughput value is greater than said predetermined maximum throughput value, applying a delay to said communications channel before determining whether or not one time period has completed;

computer program code for, in a determination that said total throughput value is not greater than said predetermined maximum throughput value, determining whether or not one time period has completed; and computer program code for, in a determination that one time period has completed, retrieving a total throughput value and an exponential moving average (EMA) throughput value of said communications channel;

generating a new EMA throughput value en equal to $((t-eo)h)-eo$, where t is the total throughput value, eo is an old EMA value, and h is a percentage; and adjusting said total throughput value to said total throughput value minus said predetermined maximum throughput value if said new EMA throughput value is greater than said predetermined maximum throughput value else adjusting said total throughput value to zero if said new EMA throughput value is not greater than said predetermined maximum throughput value.

3. A computer system capable of controlling throughput in a communications channel between a host and a storage subsystem, said computer system comprising:

means for determining whether or not a total throughput value is greater than a predetermined maximum throughput value set by a manufacturer of the storage subsystem;

means for, in a determination that said total throughput value is greater than said predetermined maximum throughput value, applying a delay to said communications channel before determining whether or not one time period has completed;

means for, in a determination that said total throughput value is not greater than said predetermined maximum throughput value, determining whether or not one time period has completed; and means for, in a determination that one time period has completed, retrieving a total throughput value and an exponential moving average (EMA) throughput value of said communications channel;

generating a new EMA throughput value en equal to $((t-eo)h)-eo$, where t is the total throughput value, eo is an old EMA value, and h is a percentage; and adjusting said total throughput value to said total throughput value minus said predetermined maximum throughput value if said new EMA throughput value is greater than said predetermined maximum throughput value else adjusting said total throughput value to zero if said new EMA throughput value is not greater than said predetermined maximum throughput value.

\* \* \* \* \*